E. SCHNEIDER.
CENTRALLY PIVOTED GUN CARRIAGE MOUNTED ON WHEEL PLATFORM.
APPLICATION FILED SEPT. 13, 1918.

1,318,233.

Patented Oct. 7, 1919.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

CENTRALLY-PIVOTED GUN-CARRIAGE MOUNTED ON WHEEL-PLATFORM.

1,318,233.      Specification of Letters Patent.      Patented Oct. 7, 1919.

Application filed September 13, 1918. Serial No. 253,993.

*To all whom it may concern:*

Be it known that I, EUGÈNE SCHNEIDER, a citizen of the French Republic, and a resident of 42 Rue d'Anjou, Paris, France, have invented a new and useful Improvement in or Relating to Centrally-Pivoted Gun-Carriages Mounted on Wheel-Platforms, which invention is fully set forth in the following specification.

This invention has for its object to provide an improved trail gun carriage having a central pivot formed on or by a wheel platform.

The improved gun carriage is characterized by an apparatus which relieves the axle or the wheels of the greater part of the strains generated by firing at high angles of elevation.

According to this invention the gun carriage carries one or more supporting members the lower ends of which are normally kept out of contact with the wheel platform by an elastic device interposed between the platform and the carriage trail or between the carriage trail and the axle. When firing at high angles of elevation the yield of the interposed elastic device allows the lower ends of the supporting members to come into contact with the platform, and thereby insures that the strains shall be transmitted to the said platform through the medium of the said supporting members.

Various practical forms embodying this invention are illustrated by way of example in the accompanying drawings in which:

Figures 1 to 4 inclusive illustrate a first constructional form.

The right hand half of Fig. 3 is a vertical cross section on the line X—X of Fig. 1; the left hand half is a vertical cross section on the line Y—Y of Fig. 1.

Figs. 5 to 8 inclusive illustrate a second practical form embodying this invention.

Figs. 9 to 11 inclusive illustrate a third constructional form embodying this invention.

In these figures, A is the trail of a gun carriage of any suitable type and caliber. B is the axle with the wheels C. The gun carriage is combined with a wheel platform D which can be connected in the usual way by means of tie-rods E to an anchored platform F.

According to this invention the gun carriage carries supporting members G designed to transmit to the platform D the strains that are generated when firing at high angles of elevation.

Figure 4:
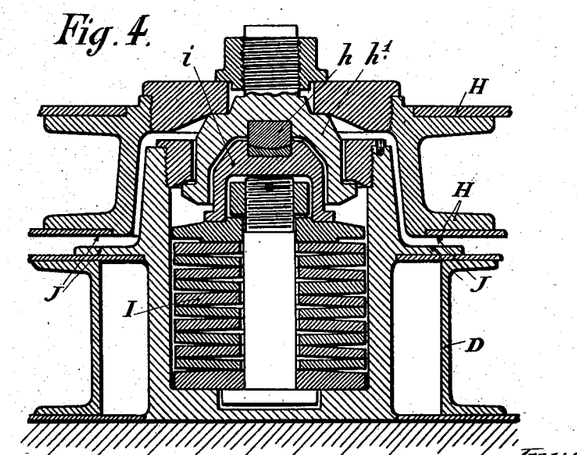
Fig. 4 is a partial vertical section on a larger scale on the line IV—IV of Fig. 3.
Figure 5:
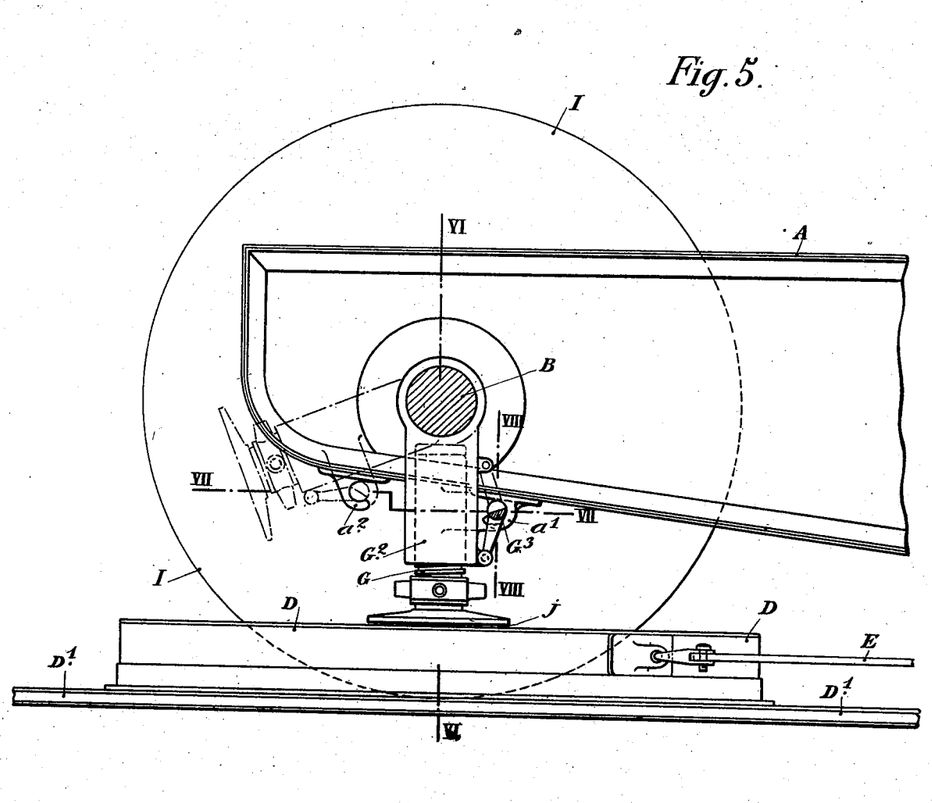
Fig. 5 is a partial side elevation partly in longitudinal section on the line V—V of Fig. 6.

In the first example of construction, the lower ends of the supporting members G are connected together by a stay H. This stay is normally kept out of contact with the platform D by an interposed elastic device. This elastic device is in this example constructed as shown in detail in Fig. 4; I being a spring composed for instance of a pile of Belleville washers bearing upon the platform D and carrying a cup $i$ that supports a bearing block $h$ carried by the stay H.

It will be readily perceived that in firing at high angles of elevation, the generated strains are transmitted through the supporting members G and the stay H first to the interposed elastic device I. The latter device yields through a distance which is equal to the "play" J provided for between the stay H and the platform D, after which the strains are transmitted directly to the platform D. The wheels C are therefore relieved of these strains.

The stay H is preferably independent of the supporting members G, and serves simply to support the lower ends $g$ of the latter. Thus by making the supporting members in the form of screw spindles working in nuts $a$ formed on the gun trail, the said spindles can be raised at will by means of cranks or levers $G^1$ in such a manner that they shall not project below the cheeks of the trail.

Figure 1:
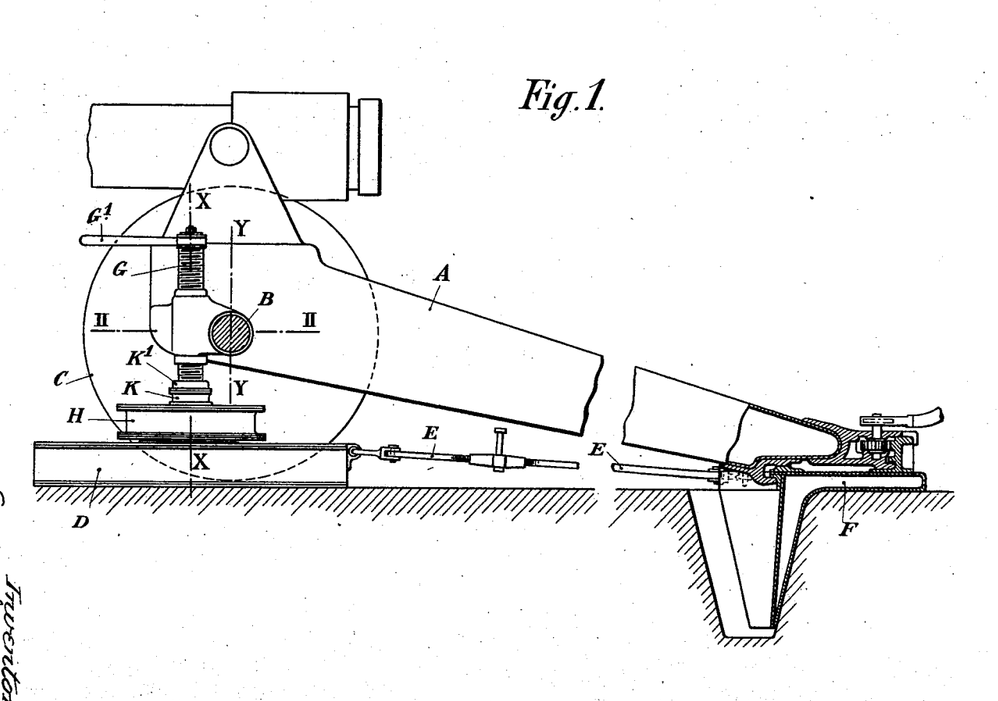
Fig. 1 is a side elevation partly in longitudinal section.
Figure 2:
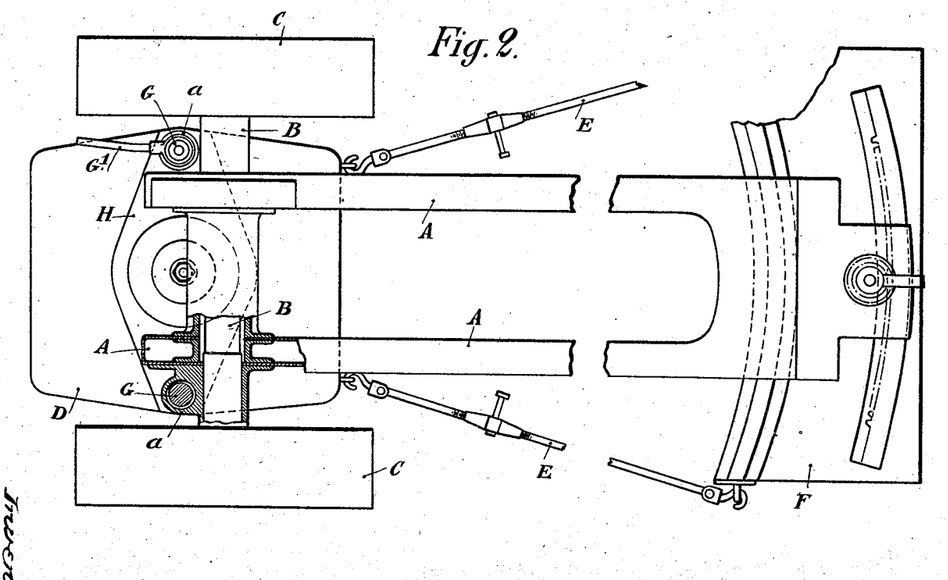
Fig. 2 is a plan thereof partly in section on the line II—II of Fig. 1.
Figure 3:
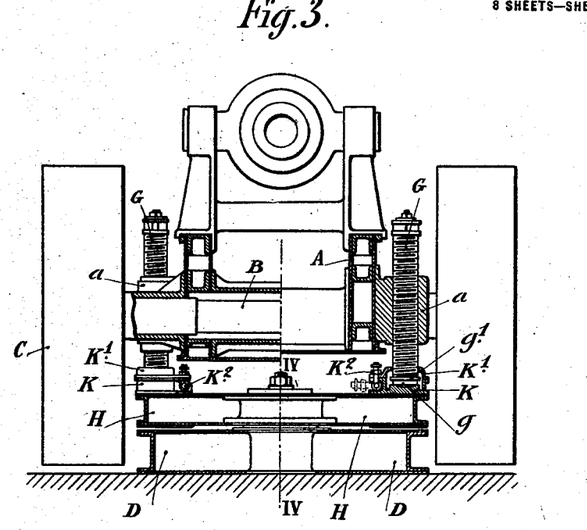

In the example shown, the lower end $g$ of each supporting member is normally prevented from making any rising movement and also from making any lateral movement by being mounted in a divided box. The body K of this box is fixed to the stay H, while the top $K^1$ is attached to the body of the box by means of a turned down latch $K^2$. In order to raise the spindles G it is sufficient to turn the latch down into the position indicated in dot and dash lines in Fig. 3. The top $K^1$ is then raised by means of a collar $g^1$ on the foot of the supporting member, while the box body K remains attached to the stay H. It is also to be noted that the stay H, while being capable of pivoting with the gun carriage on the platform D, is connected to the latter by means of the cap $h^1$ carrying the bearing block $h$.

It is to be observed, when the gun is mounted in firing position, that the stay H constitutes a buffer plate that is normally maintained separated from but in close juxtaposition to the platform D by the elastic device I, and that the weight of the carriage with its load is carried on the stay or buffer plate by the supporting member G connected to the carriage and mounted on the stay or plate. During firing, the shock from a discharge is imparted through the carriage and supporting member G to the buffer plate or stay H, and the initial energy of the shock is absorbed by the elastic device I. The elastic device yields to this strain and permits the buffer plate or stay to impact on the platform D to transmit thereto the residual energy of the shock, where it is further absorbed or transmitted to the ground. There is comparatively little play, as at J, between the buffer plate and the platform and as a result but little movement of the gun and carriage is required to accommodate the recoil. Consequently, as the gun has been displaced but comparatively little, it returns almost instantly to its original firing position and with little or no impairment of its aim.

Figure 6:
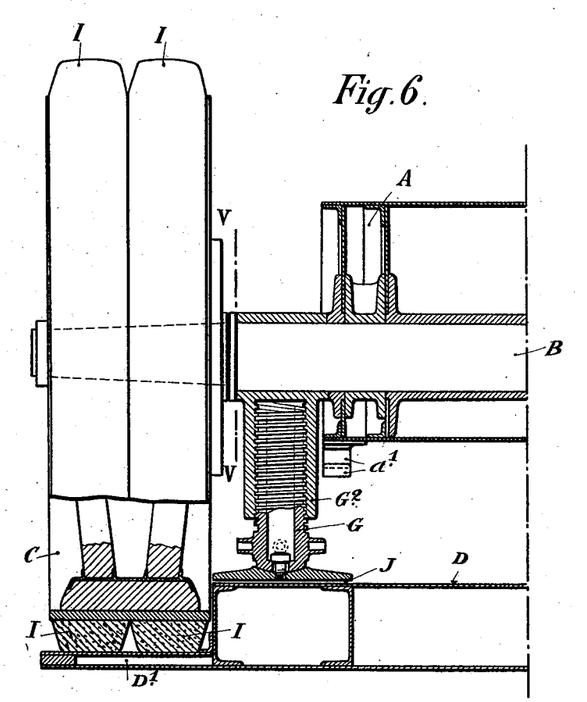
Fig. 6 is a half section on the line VI—VI of Fig. 5.
Figure 7:
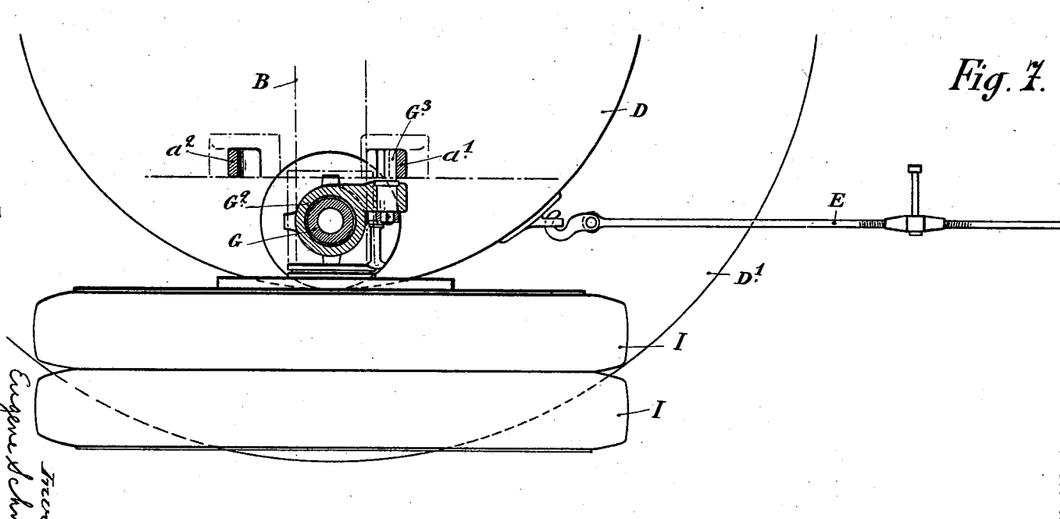
Fig. 7 is a horizontal section on the line VII—VII of Fig. 5.
Figure 8:
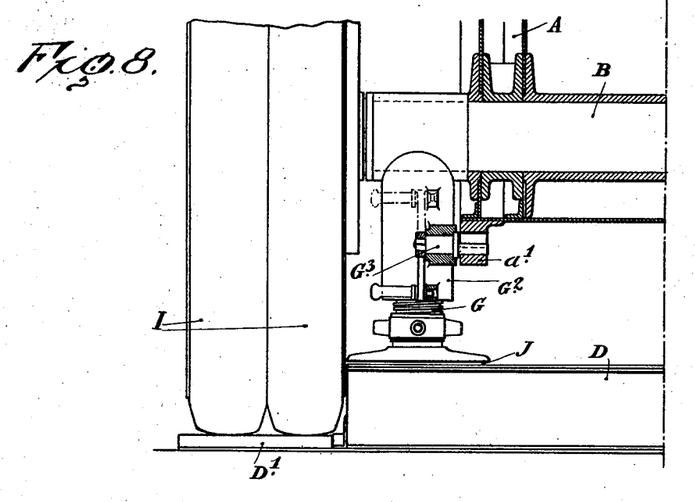
Fig. 8 is a partial elevation, partly in vertical section, on the line VIII—VIII of Fig. 5.

In the example of Figs. 5 to 8, the supporting members serving to transmit the firing strains to the wheel platform D, are carried by the axle B. The interposed elastic device which normally keeps the lower ends of the supporting members at a distance J off the platform is in this construction constituted simply by the elastic tires I of the wheels C bearing upon a lateral border $D^1$ of the platform D. The amount of "play" J may be adjusted when the parts are at rest. For this purpose each supporting member may, as shown in Fig. 6, consist of a socket $G^2$ carried by the axle B and having a screw-threaded bore in which the screw-threaded part of a supporting member G may be engaged to a greater or less extent. When the "play" has been suitably adjusted in the position of rest it will be readily understood that the yielding of the elastic tires I, during the firing, will rapidly bring the feet of the supporting members into contact with the platform D.

In this example of construction the centering of the gun carriage upon the platform D for the purpose of training the gun is effected as will be perceived without the aid of a central pivot, since the body of the platform keeps the wheels always at the desired distance from the axis of the platform.

The supporting members may be adapted to be lifted for transport, and for this purpose the socket $G^2$ is movably mounted on the axle B. The fixing of the socket in the position of use and position for transport (indicated in dot and dash lines in Fig. 5) respectively is effected by means of a suitable catch. The trail A may be provided with two hooks or catches $a^1$, $a^2$ for engaging a cut-away axle-pin $G^3$ carried by the socket $G^2$.

Figure 9:
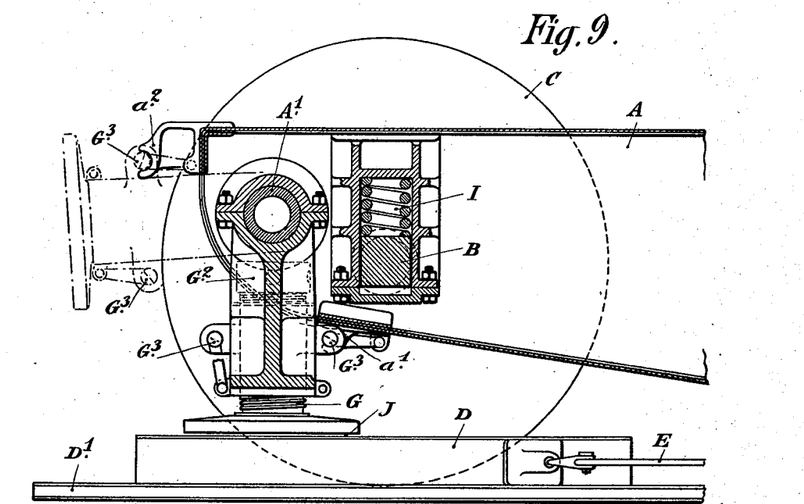
Fig. 9 is a partial side elevation, partly in longitudinal section.
Figure 10:
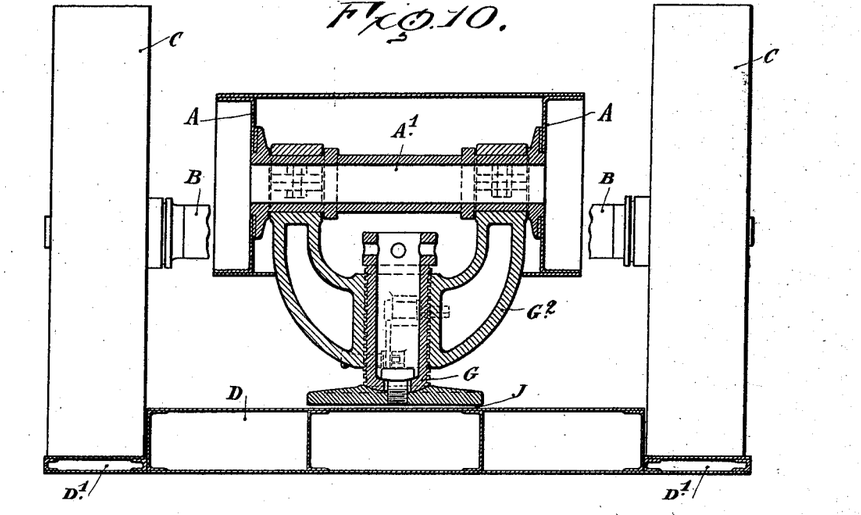
Figs. 10 and 11 are rear elevations, partly in transverse section.
Figure 11:
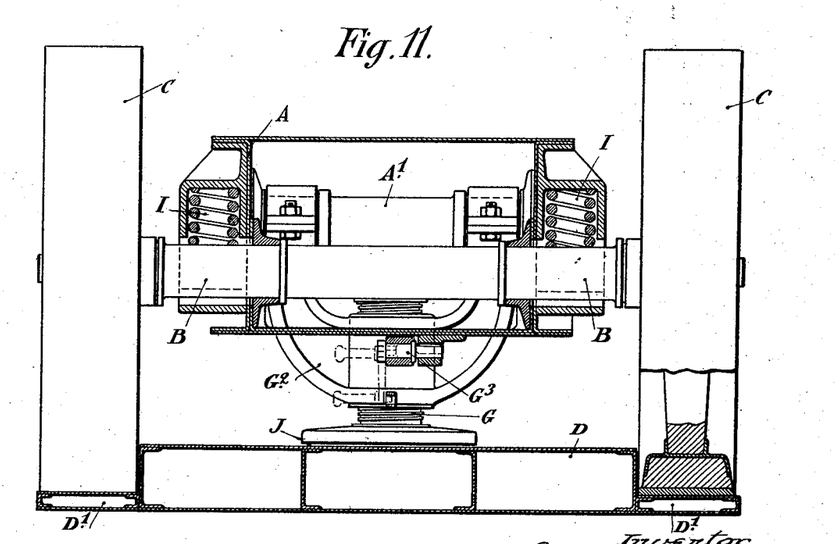

In the example of Figs. 9 to 11, a single supporting member G is provided in the form of a screw spindle arranged in the plane of the longitudinal axis of the gun carriage in such a manner that its axis coincides with the axis of the wheel platform D. It is movably mounted in a nut-like support $g^2$ pivoted on an axle-like stay $A^1$ connecting the cheeks of the gun carriage A.

The wheels C, which are kept at a constant distance from the axis of the platform by the body of the said platform, bear upon a border $D^1$ as in the preceding example. The elastic device that normally assures the "play" J between the foot of the supporting member and the platform is in this construction constituted by springs I bearing at one end upon the axle B and at their other ends against the underside of abutments formed on the cheeks of the gun carriage.

In firing at high angles of elevation the yielding of the springs I allows the foot of the supporting member to come into contact with the platform D.

The nut-like support $G^2$ and the body G of the supporting member may be made capable of being raised together for transport into the position indicated in dot and dash lines in Fig. 9. The nut-like support is for this purpose provided with cut-away axle-pins $G^3$ one of which may lock the supporting member to a hook $a^1$ of the gun carriage so as to hold it in its position of use. The other cut-away axle-pin may lock the supporting member in position for transport to another hook $a^2$ carried by the gun carriage.

Having now described my invention what I claim as new and desire to secure by Letters-Patent is:—

1. In combination with a trail gun carriage and a wheel platform providing a central pivot therefor, a buffer plate, a supporting member on the carriage carrying the buffer plate and adapted to position the same in parallel relation with the platform, and an elastic device coöperating with said supporting member to normally maintain the buffer plate separated from but in close juxtaposition to the platform, said elastic device operating to absorb the initial energy imparted to the carriage by a firing strain and yielding to such strain to permit the impact of the buffer plate directly upon the platform to transmit the residual energy from the carriage to the platform.

2. In combination with a trail gun carriage and a wheel platform providing a central pivot therefor, a buffer plate, a supporting member on the carriage carrying the buffer plate and adapted to position the same in parallel relation with the platform, adjusting means in said supporting member for regulating the relative positions of the carriage and buffer plate to facilitate the positioning of the buffer plate relative to the platform, and an elastic device coöperating with said supporting member to normally maintain the buffer plate separated from but in close juxtaposition to the platform, said elastic device operating to absorb the initial energy imparted to the carriage by a firing strain and yielding to such strain to permit the impact of the buffer plate directly upon the platform to transmit the residual energy from the carriage to the platform.

3. In combination with a trail gun carriage and a wheel platform providing a central pivot therefor, a buffer plate, a supporting member on the carriage carrying the buffer plate and adapted to position the same in parallel relation with the platform, said supporting member including a screw and nut for regulating the length of the supporting member to adjust the carriage and buffer plate relative to each other and to position the buffer plate relative to the platform, and an elastic device coöperating with said supporting member to normally maintain the buffer plate separated from but in close juxtaposition to the platform, said elastic device operating to absorb the initial energy imparted to the carriage by a firing strain and yielding to such strain to permit the impact of the buffer plate directly upon the platform to transmit the residual energy from the carriage to the platform.

4. In combination with a trail gun carriage and a wheel platform providing a central pivot therefor, a buffer plate to be positioned in close parallel relation with said platform, a supporting member connecting the carriage with the buffer plate and operative to shift the weight of the carriage and its load to said plate, and an elastic device normally maintaining the positioned buffer plate separated from the associated platform but in close juxtaposition thereto, said elastic device operating during a discharge to absorb the initial energy of the shock imparted to the buffer plate through the carriage and supporting member and said elastic member yielding to such strain to permit the impact of the buffer plate directly on the platform to transmit the residual energy of the shock thereto.

5. In combination with a trail gun carriage and a wheel platform providing a central pivot therefor, a supporting member carried by said carriage, an elastic device carried by the wheel platform, and a cup and bearing block between said elastic device and said supporting member, said elastic device normally maintaining the lower end of said supporting member out of contact with said platform but yielding under firing strains to engage said supporting member with said platform to transmit the strains thereto.

6. In combination with a trail gun carriage and a wheel platform providing a central pivot therefor, a supporting member carried by said carriage and comprising screw spindles working in nuts on said carriage and a cross beam or stay with which said spindles are datachably engaged, and an elastic device coöperating with said cross beam or stay to normally maintain the same out of contact with said platform but yielding under firing strains to engage said cross beam or stay with said platform to transmit the strains thereto.

7. In combination with a trail gun carriage and a wheel platform providing a central pivot therefor, a supporting member carried by said carriage and comprising screw spindles working in nuts on said carriage and a cross beam or stay carrying cups in which the lower ends of said screw spindles engage, and an elastic device coöperating with said cross beam or stay to normally maintain the same out of contact with said platform but yielding under firing strains to engage said cross beam or stay with said platform to transmit the strains thereto.

8. In combination with a trail gun carriage and a wheel platform providing a central pivot therefor, a supporting member carried by said carriage and comprising screw spindles working in nuts on said carriage, a cross beam or stay, divided boxes, the parts of which are carried by said spindles and said cross beam or stay, means to lock said box parts together to retain said cross beam or stay on said spindles, and an elastic device coöperating with said cross beam or stay to normally maintain the same out of contact with said platform but yielding under firing strains to engage said cross beam or stay with said platform to transmit the strains thereto.

9. In combination with a trail gun carriage and a wheel platform providing a central pivot therefor, a buffer plate to be positioned in close parallel relation with said platform, a supporting member connecting the carriage with the buffer plate and operative to shift the weight of the carriage to said plate, and an elastic device interposed between the platform and the associated buffer plate to normally maintain said plate separated from but in close juxtaposition to the associated platform, said elastic device operating during a discharge to absorb the initial energy of the shock imparted to the buffer plate through the carriage and supporting member and said elastic member yielding to such strain to permit the impact of the buffer plate directly on the platform to transmit the residual energy of the shock thereto.

In testimony whereof I have signed this specification.

EUGÈNE SCHNEIDER.

Witnesses:
ANDRÉ MOSTICKER,
JOHN F. SIMONS.